Figure 1:
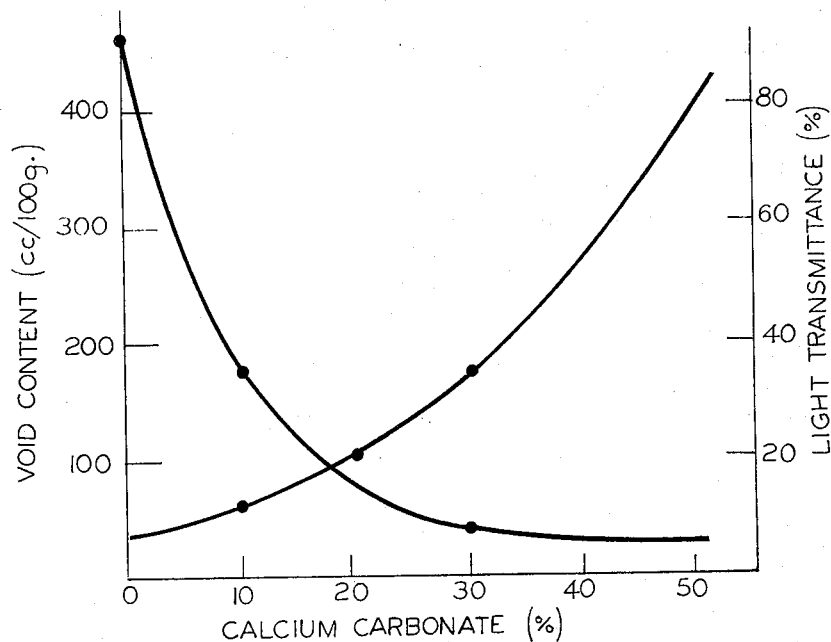

United States Patent [19]
Yoshimura et al.

[11] 3,773,608
[45] Nov. 20, 1973

[54] PAPER-LIKE POLYMERIC FILMS AND PRODUCTION THEREOF

[75] Inventors: Shohei Yoshimura; Takeshi Matsui; Takeshi Yamaguchi, all of Kozu, Japan

[73] Assignee: Toyo Boseki Kabushiki Kaisha, Osaka, Japan

[22] Filed: Mar. 15, 1971

[21] Appl. No.: 124,037

[30] Foreign Application Priority Data
Sept. 16, 1970 Japan.............................. 45/81405
Sept. 18, 1970 Japan.............................. 45/82074
Dec. 26, 1970 Japan.............................. 45/125389

[52] U.S. Cl.................. 161/168, 156/160, 156/229, 161/116, 161/402
[51] Int. Cl......................... B29d 7/24, B29d 27/00
[58] Field of Search.................. 161/402, 116, 168, 161/162; 260/41 R, 41 A; 156/160, 229

[56] References Cited
UNITED STATES PATENTS
3,634,564  1/1972  Okamoto et al..................... 161/402
3,154,461  10/1964  Johnson............................ 161/116
3,222,191  12/1965  Steiner et al....................... 260/41 R
3,431,225  3/1969  Duncan............................. 260/41 A
3,503,922  3/1970  Carton.............................. 260/41 A
3,515,626  6/1970  Duffield............................ 161/402
3,539,439  11/1970  Calderwood et al................ 161/402

Primary Examiner—William J. Van Balen
Attorney—Wenderoth, Lind & Ponack

[57] ABSTRACT

The present invention relates to a paper like polymeric film and a method of production thereof, said film being made up of a composition containing at least 5 percent by weight of a polypropylene or an ethylene/propylene copolymer having an ethylene content of 0 – 15 mol percent, 5 – 70 percent by weight of a polyethylene or an ethylene/propylene copolymer having a propylene content of 0 – 30 mol percent and 5 – 50 percent by weight of a finely divided solid inorganic substance having an average particle diameter of $0.1 – 15\mu$, said film having minute internal voids, a rough surface with fine irregularities in a finely fibrillated state, and being oriented in at least one direction, the void content of said film being 40 – 300 c.c./100 g. and wherein the transmittance of light rays therethrough is not higher than 70 percent.

6 Claims, 2 Drawing Figures

Patented Nov. 20, 1973

3,773,608

INVENTORS
SHOHEI YOSHIMURA
TAKESHI MATSUI
TAKESHI YAMAGUCHI

BY Wenderoth, Lind & Ponack
ATTORNEYS

PAPER-LIKE POLYMERIC FILMS AND PRODUCTION THEREOF

The present invention relates to paper-like thermoplastic polymeric films and production thereof. More particularly, this invention relates to a paper-like film which comprises a blend of a polypropylene resin and polyethylene resin and, occassionally polystyrene resin, added with a finely divided inorganic substance, said film being oriented in at least one direction, having internal minute voids and having a finely fibrillated rough surface. This invention also relates to the production of such paper-like film.

It is known to produce a polymeric shaped article containing internal minute voids by incorporating a foaming agent into an organic polymer and causing the foaming agent to form during the shaping. However, a shaped article obtained by such process is nonuniform in the void size and is low in the mechanical properties. Further, there is known a process (Japanese Patent Publication No. 15560/1969) for producing stretched void-containing film wherein a film of a blend of a rubbery substance with a thermoplastic plastic material is unstretched so that fine voids are formed in the interior of the film. However, since the rubbery substance is blended in, the resulting porous film is high in the impact strength but has drawbacks that it tends to shrink and is low in the dimensional stability. It is also known to produce a paper-like polymeric film by stretching, in a plastic state, a film made of a mixture of an inorganic substance and a polypropylene and then quenching the same (Japanese Patent Publication No. 11825/1963). However, in this process, it is difficult to uniformly stretch the film. Further, the resulting paper-like film is roughened only at the surface and has no internal minute voids. Therefore, this paper-like film is low in the strength, has no elasticity and is not sufficient in the writability (easiness in marking by usual writing instruments such as pencil and pen).

Therefore it is a primary object of this invention to provide a paper-like polymeric film having desirable paper-llke characteristics such as excellent dimensional stability, opaqueness (low in transmittance of natural rays), writability and printability.

It is another object of this invention to provide a method for producing such paper-like polymeric films.

Other objects of this invention will be apparent from the following description.

Briefly, this invention provides a paper-like polymeric film which comprises a composition comprising at least 5 percent by weight of a polypropylene or ethylene/propylene copolymer having an ethylene content of 0 – 15 mol percent, 5 – 70 percent by weight of a polyethylene or ethylene/propylene copolymer having a propylene content of 0 – 30 mol percent, and 5 – 50 percent by weight of finely divided solid inorganic substance having an average particle diameter of 0.1 – 15 $\mu$ and dispersed in the film, said film being oriented in at least one direction, having internal minute voids and having a finely fibrillated rough surface, the void content being 40 – 300 c.c./100 g. and the transmittance of natural rays being not higher than 70 percent.

If desired to said composition may further contain 5 – 60 percent by weight of a styreneic resin.

According to the invention, the above mentioned paper-like polymeric film is prepared by preparing a composition comprising at least 5 percent by weight of a polypropylene or ethylene/propylene copolymer having an ethylene content of 0 – 15 mol percent, 5 – 70 percent by weight of a polyethylene or ethylene/propylene copolymer having a propylene content of 0 – 30 mol percent (and occassionally 5 – 60 percent by weight of a styrenic resin) and 5 – 50 percent by weight of a finely divided solid inorganic substance having an average particle diameter of 0.1 – 15 $\mu$, forming the composition into a film and then stretching the film in at least one direction.

The thickness of the film of the present invention is 20 – 1500 $\mu$. The term "fibrillated" as used in the present specification is to mean that, according to microscopic observation, the film surface is in such state that continuous fine filaments are entangled with one another to form a rough surface.

The polypropylene or ethylene/propylene copolymer to be used in the present invention is of an ethylene content of 0 – 15 mol percent (sometimes referred to as "propylenic resin" hereinafter). Preferable propylenic resin is a crystalline one wherein, when 10 g. of a powder of this polymer is extracted with 200 c.c. of n-heptane for 6 hours in a Soxhlet extractor, the unextracted part is at least 60 percent by weight, preferably more than 70 percent by weight. If the ethylene content in the propylenic resin exceeds 15 mol percent, the film would tend to shrink and become low in the dimensional stability. The melt index of the propylenic resin should not exceeds 15 g. /10 minutes, because, if exceeds, the shapability and stretchability of the film become low. The melt index is measured by a method according to JIS-K6760 and is represented by the amount (weight) of extrusion when the propylenic resin melted at 230°C. is extruded under a pressure of 2160 g, for 10 minutes through a nozzle of an orifice diameter of 2.09 mm. and a length of 168 mm. The content of the propylenic resin in the composition should be at least 5 percent by weight.

The polyethylene or ethylene/propylene copolymer (hereinafter sometimes referred to as "ethylenic resin") to be blended into the propylenic resin is of a propylene content of 0 to 30 mol percent. Preferable ethylenic resin is a crystalline one wherein, when 10 g. of a powdery polymer with 200 c.c. of n-heptane for 6 hours in a Soxhlet extractor, the unextracted part is at least 60 percent by weight, preferably more than 70 percent by weight. A high density polyethylene is most preferable. If the propylene content in the ethylenic resin exceeds 30 mol percent, the film is likely to shrink and tends to become low in the dimensional stability.

This ethylenic resin is blended in an amount of 5 to 70 percent by weight, preferably 15 to 45 percent by weight based on the total composition. If the amount of the ethylenic resin in the total composition for forming the film is less than 5 percent by weight, the resulting film will be difficult to be uniformly stretched at a high speed. If the amount of the ethylenic resin exceeds 70 percent by weight, the mechanical properties of the film becomes poor.

It is preferable that the melt index of the ethylenic resin is lower than the melt index of the propylenic resin. The smaller the ratio which is less than 1/10, the rougher the surface of the resulting film so as to tend to lose the gloss. The larger the ratio which is more than 1/5, the smoother the surface of the resulting film so as to tend to retain the gloss.

The composition may also contain a styrenic resin in addition to the above mentioned blend of the propylenic resin and ethylenic resin. The addition of such styrene resin will improve the stiffness and workability of the film. Examples of such styrenic resins are a polystyrene, acrylonitrile/butadiene/styrene copolymer, acrylonitrile/styrene copolymer and butadiene/styrene copolymer. The styrenic resin should have a melt index of 0.01 to 10 g./10 minutes, preferably 0.1 to 5.0 g./10 minutes as measured at a temperature of 190°C. under a load of 2.1 kg. by ASTM-D-1238-65T. Particularly a polystyrene of a density of 1.0 to 1.2 g/cm$^3$ as measured according to JIS-K-6871 is preferable.

The styrenic resin is blended in an amount of 5 to 60 percent by weight, preferably by 10 to 45 percent by weight based on the total composition. If the amount of the styrenic resin exceeds 60 percent by weight the mechanical properties and heat-resistance of the film will become low, fine voids would no longer be formed in the film and the writability tends to remarkably reduce.

The composition for forming the film according to this invention should contain an inorganic substance in the form of finely divided solid particles. Examples of such inorganic substances are calcium carbonate, calcium oxide, silicon dioxide, titanium dioxide, aluminum oxide and aluminum sulfate. Particularly calcium carbonate is preferable. The average particle diameter of the inorganic substance should be 0.1 to 15 $\mu$, preferably 0.5 to 10 $\mu$. If the particle diameter of the inorganic substance is less than 0.1 $\mu$, it would be difficult to form minute voids throughout the film, i.e., from the surface to the interior of the film. Further, if the average particle diameter exceeds 15 $\mu$, the stretchability of the film is lowered.

It is preferable that 5 to 50 percent by weight, particularly 10 to 25 percent by weight (based on the total composition) of such inorganic substance is blended into the film-forming composition. If this amount is less than 5 percent by weight, voids will be not sufficiently formed in the film. On the other hand, if the content of such inorganic substance exceeds 50 percent by weight it would become difficult to stretch the film.

The resinous material (propylenic resin and ethylenic resin with or without styrenic resin) and inorganic substance may be blended in any known and suitable manner. However, it is most preferable to blend them together in the form of powder.

The blended composition is then melted at 200° to 350°C., preferably at 220° to 280°C. and is extruded in the form of a film. Then the extruded hot film is cooled on a cooling roll or in a liquid at 0° to 130°C., preferably at 20° to 110°C. The method and apparatus for forming a film and cooling the same are well known in the art so that no further explanation thereabout would be required.

Then the film is stretched for orientation in at least one direction at a temperature of 40° to 170°C., preferably at a temperature of 70° to 150°C. In the case of stretching in one direction, the film is stretched 3 to 20 times, preferably 5 to 10 times the length. By this stretching, minute voids in the form of a spindle having a long axis substantially in parallel with the direction of stretching are formed in and throughout the film. The length of the long axis of such void is 2 to 150 $\mu$ as measured in the microscopic photograph. The amount of formation of such voids tends to increase with the increase in the factor or ratio of stretching and with the decrease in the stretching temperature. Further, the surface of the stretched film is of such structure in which fine irregularities or roughness in a fibrillated state are present. The average depth of such fibrillated rough surface layer is 0.3 to 5 $\mu$.

In the case of biaxially stretching the film, it is preferable to stretch the same 8 to 45 times, preferably 10 to 35 times the original area. In this case, the void formation tends to increase with the increase in the factor or ratio of the stretching. The formed voids are substantially spherical and have an average diameter of 4 to 250 $\mu$. Sometimes or somewhere the voids are continuous and not independent. Further, the fibrillation at the film surface is more promoted by the biaxial stretching than by the monoaxial stretching, so that the average depth of such fibrillated layer is 0.5 to 10 $\mu$.

The biaxial stretching may be conducted simultaneously or successively. The above mentioned stretching temperature and stretching ratio are applied generally to simultaneous biaxial stretching. In conducting the biaxial stretching successively, the film is first stretched at 40° to 170°C. and 4 to 6 times the original length in one direction and then at a temperature higher than in the first stretching but below 220°C. and 5 to 7 times the original length in another direction substantially at right angles to the above mentioned first stretching direction. In this case, it would be necessary to conduct the second stretching in such a manner that the voids already formed during the first stretching are not destroyed and the film is not broken.

The stretched film may further be heat-treated at 130° to 210°C. for 1 second to 3 minutes in order to reduce the thermal shrinkage of the film and to improve the dimensional stability.

If desired, a surface activating treatment such as a corona discharge or flame treatment may be applied to the film, so the writability with an aqueous ink and the adhesion to any other substance can be improved. Further, the film may be embossed on the surface or may be coated.

The composition for forming the film may also contain a small amount of such additive as a stabilizer, antistatic agent, dye or pigment.

The paper-like film thus obtained contains minute or fine internal voids of a diameter of 4 to 250 $\mu$. The void content is 30 to 300 c.c./100 g. The film has a fibrillated rough surface portion whose depth is 0.5 to 10 $\mu$. The film is oriented, high in the elasticity and the transmittance of natural rays is not higher than 70 percent. If the transmittance exceeds 70 percent, the gloss is so much and the writability is not so good. The film is high in the dimensional stability, uniformly fibrillated on the surface. The film is opaque like paper and has an excellent writability and printability. Particularly a biaxially stretched film is preferable because the difference in the mechanical physical properties in the longitudinal and transverse directions is small. Further, a film made from a composition in which a styrenic resin is blended has characteristic of the so-called "stiffness" and therefore is smoother in the feed to a machine (machine suppliability) than a film in which such styrenic resin is absent, and can be printed with a clear outline without being swollen with ink.

The film of the present invention is useful as a film for printing, film for writing, releasing film and protective film for plywoods, decorative sheets, etc., book cover, frosted printed lamination, insulating material, base material for vapor-deposition, film for printed layer for plywoods or as packing or wrapping material.

The paper-like film of this invention may be coated at least one surface with a biaxially oriented polypropylene layer. Such coated film is remarkably excellent in the surface gloss, i.e., a gloss of more than 90 percent as measured at 45° and has a practical value as a packing film for high grade confections, high grade cosmetics, etc. Further, the adhesion between the base layer and covering (polypropylene) layer is very high so that, even if it is attempted to peel off the surface layer with a Scotch tape No. 59 (product of Minnesota Mining and Manufacturing Company, U.S.A.), no peeling would occur. Further the so coated film has mechanical properties which are substantially comparable with those of an ordinary transparent biaxially stretched polypropylene film.

In making such coated sheet or film, the extruded and cooled (prior to stretching) film as prepared in the manner as explained hereinbefore is coated with a polypropylene layer at one or both surfaces. Thus, for example, a polypropylene is heated above the melting point and is melt-laminated on one or both surfaces of the above base film. Alternatively an unstretched film of a polypropylene is heated and laminated on one or both surfaces of the base film under a pressure of at least 3 kg./cm², preferably 5 to 20 kg./cm² with a roll such as rubber roll. Particularly melt-laminating method is preferable. The polypropylene to be used here should have an isotactic degree of more than 85 percent and an intrinsic viscosity of 1.5 to 4 dl./g. as measured in a tetraline solution at 135°C.

Then the coated or laminated film is successively or simultaneously biaxially stretched at a temperature of 80° to 170°C., preferably 110° to 160°C. at a ratio of 8 to 70 times, preferably 10 to 55 times the original area. Upon stretching, fine or minute voids are formed in the base film and the polypropylene covering layer film is biaxially oriented to obtain a film excellent in the surface gloss.

Figure 2:
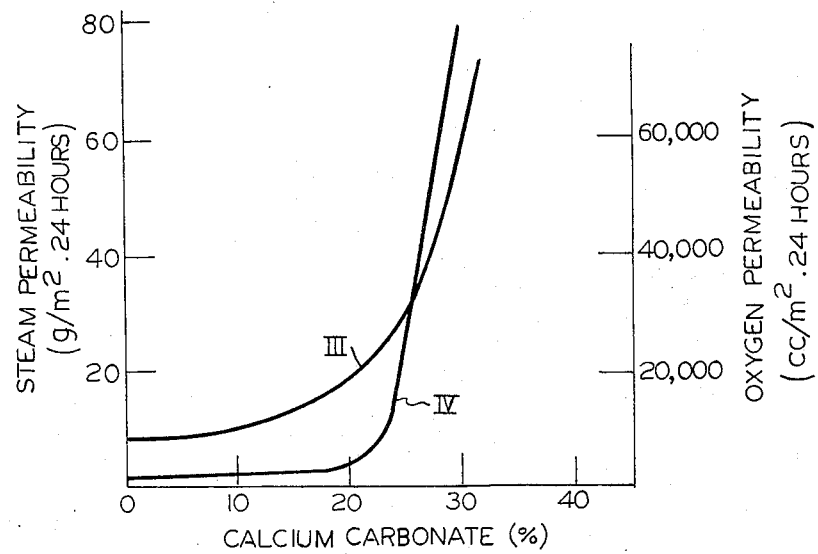

The present invention will be illustrated in the following Examples which partly refer to the accompanying drawings wherein:

FIG. 1 is a graph showing the relation between the amount of calcium carbonate and the void content and light transmittance of the resulting film; and FIG. 2 is a graph showing the relation between the amount of calcium carbonate and the steam permeability and oxygen permeability of the resulting film.

In these examples, various properties of the products (paper-like films) have been determined as follows:

1. Transmittance of natural rays:
Measured by JIS-K6714.
2. Tensile strength and tensile elongation:
Measured by JIS-Z1702.
3. Tear strength of film edge:
Measured by JIS-K6732.
4. Average depth of the rough surface:
The depths of the irregularities were measured with a gauge at 50 different points on the film surface and average thereof was calculated.
5. Thermal shrinkage:
Dimension variation rate when the film was immersed in a silicone oil at 100°C. for 1 minute.
6. Void content:
Calculated from the following formula by measuring the apparent density $d$ of the film:
Void content = $100(1 - d/D)$
wherein $$D = \frac{100}{\frac{M_1}{\rho_1} + \frac{M_2}{\rho_2} + \frac{M_3}{\rho_3} + \frac{M_4}{\rho_4}}$$

(wherein $\rho_1$, $\rho_2$, $\rho_3$ and $\rho_4$ represent respective densities of propylenic resin, ethylenic resin, styrenic resin and inorganic substance and $M_1$, $M_2$, $M_3$ and $M_4$ represent respective proportions of the propylenic resin, ethylenic resin, styrenic resin and inorganic substance in the film-forming composition).

7. Stiffness:
Measured at 20° in a bent angle and with 10 m.m. in transformation of thickness by pressure; film stiffness tester No. 580 (Toyo Seiki Kabushiki Kaisha).
8. Machine suppliability:
The number of troubles which occurred when synthetic paper (paper-like polymeric film) was fed at a rate of 4000 sheets/hour to an automatic feeding device for a printing machine was evaluated as follows:
A: Less than 1 percent.
B: 1 to 10 percent.
C: 10 to 30 percent.
D: More than 30 percent.
9. Gloss:
Measured by JIS-Z874.
10. Oxygen permeability:
Measured by ASTM D-1436-63.
11. Steam permeability:
Measured by JIS Z-0208.

EXAMPLE 1

A blend in which the content of a polyethylene (a melt index 0.06 g./10 minutes) was fixed to be 20 percent by weight but the contents of a polypropylene (melt index 2 g. /10 minutes) and calcium carbonate (average particle diameter 1.2 $\mu$) were varied as shown in Table 1 was melted at 250°C., and extruded in the form of a film, which was cooled on a cooling roll at 90°C. to obtain a film of a thickness of 900 $\mu$. This film was stretched 5 times the length in the longitudinal direction between rolls different in the peripheral velocity and heated to 135°C. Then the film was fed into a tenter at 160°C. and was stretched 8 times the width in the transverse direction to obtain a film of a thickness of 25 to 50 $\mu$. Further, this film as held with tenter clips was heat-treated for 20 seconds in a hot air furnace at 150° C.

The relations between the voids content and natural ray transmittance and the content of calcium carbonate in the resulting film are shown in FIG. 1. The curve I represents void content and the curve II represents transmittance of natural rays. As apparent from FIG. 1, with the increase in the amount of calcium carbonate, the void content of the film increases and the light transmittance is lowered. However, when the amount of calcium carbonate exceeds 30 percent by weight, the light transmittance is not noticeably lowered. When calcium carbonate content exceeded 50 percent by weight, stretching of the film became difficult. By the way, in FIG. 1, when the calcium carbonate content was 0 percent, the void content was 37 c.c./100 g. This was due to the irregularities of the film surface and no void was formed within the film.

FIG. 2 shows relation between the steam permeability and oxygen permeability and the amount of calcium carbonate. The curve III represents steam permeabilities and the curve IV represents oxygen permeabilities. As evident from FIG. 2, with the increase of the amount of calcium carbonate, both the steam permeability and oxygen permeability increase. However, when the amount of calcium carbonate is less than 20 percent by weight, the rate of the increase is slight. When the calcium carbonate content is more than 20 percent by weight, the rate of increase in these permeabilities becomes sharp.

The mechanical properties and thermal properties of the resulting paper-like film obtained with the use of the composition comprisng 25 percent by weight of calcium carbonate, 55 percent by weight of polypropylene and 20 percent by weight of polyethylene are shown in Table 4.

EXAMPLES 2 to 7

A blend in which the content of an ethylene/propylene copolymer (mol ratio 90/10) of a melt index of 0.1 g./10 minutes was fixed to be 40 percent by weight but the contents of a polypropylene (melt index 2 g./10 minutes) and calcium carbonate (average particle diameter 1.2 $\mu$) were varied as shown in Table 1 was melted at 250°C. and extruded in the form of a film, which was cooled on a cooling roll at 90°C. to obtain a film of a thickness of 900 $\mu$. The film was stretched 5 times the length in the longitudinal direction between rolls different in the peripheral velocity and heated to 135°C. Then the film was fed into a tenter at 155°C. to stretch 8 times the width in the transverse direction to obtain a film of a thickness of 30 to 50 $\mu$. Further, this film as held with tenter clips was heat-treated for 20 seconds in a hot air furnace at 150°C.

the relations between the void content, average depth of the rough surface and light transmittance and the content of calcium carbonate in the resulting film are shown in Table 1.

TABLE 1

| Example | Amount of calcium carbonate (%) | Void content (c.c./100g.) | Light transmittance (%) | Average depth of the rough surface ($\mu$) |
|---|---|---|---|---|
| 2 | 0 | 28 | 93 | 0.1 |
| 3 | 5 | 41 | 69 | 0.5 |
| 4 | 10 | 70 | 39 | 0.7 |
| 5 | 20 | 103 | 24 | 1.0 |
| 6 | 30 | 162 | 9 | 0.9 |
| 7 | 40 | 211 | 5 | 1.1 |

As apparent from Table 1, with the increase in the blended amount of calcium carbonate, the void content of the film increases and the light (natural rays) transmittance reduces. By the way, when the calcium carbonate content was 55 percent by weight, the film was broken in the course of the stretching. The mechanical properties and thermal properties of the paper-like film in Example 5 in which the amount of calcium carbonate was 20 percent by weight are shown in Table 4.

REFERENCE EXAMPLE 1

A blend of 40 percent by weight of a polypropylene (melt index 2 g./10 minutes), 40 percent by weight of an ethylene/propylene copolymer (ethylene content 40 percent by mol) and 20 percent by weight of calcium carbonate (particle diameter 1.2 $\mu$) was melted at 240°C. and was extruded to obtain a film of a thickness of 900 $\mu$. This film was stretched and heat-treated under the same conditions as in Example 2. The mechanical properties and thermal properties of the resulting film are shown in Table 4.

EXAMPLES 8 to 13

A blend in which the content of a polyethylene (melt index 0.06 g./10 minutes) was fixed to be 40 percent by weight but the contents of an ethylene/propylene copolymer (mol ratio of 5/95) of a melt index of 3 g./10 minutes and calcium carbonate (average particle diameter 1.2 $\mu$) were varied as shown in TABLE 2 was melted at 250°C. and extruded in the form of a film which was cooled on a cooling roll at 90°C. to obtain a film of a thickness of 900 $\mu$. This film was stretched 5 times the length in the longitudinal direction between rolls different in the peripheral velocity and heated to 130°C. Then the film was fed into a tenter at 155°C. and was stretched 8 times the width in the transverse direction to obtain a film of a thickness of 25 to 50 $\mu$. Further, this film as held with tenter clips was heat-treated for 20 seconds in a hot air furnace at 150°C.

The relations between the void content and light transmittance and the content of the calcium carbonate in the resulting film are shown in Table 2.

TABLE 2

| Example | Amount of calcium carbonate (%) | Void content (c.c./100g.) | Light transmittance (%) |
|---|---|---|---|
| 8 | 0 | 31 | 92 |
| 9 | 5 | 42 | 68 |
| 10 | 10 | 74 | 37 |
| 11 | 20 | 105 | 21 |
| 12 | 30 | 171 | 8 |
| 13 | 40 | 240 | 5 |

As apparent from Table 2, with the increase in the blended amount of calcium carbonate, the void content of the resulting film increases and the light (natural rays) transmittance reduces. By the way, when calcium carbonate was added in an amount of 55 percent by weight, the film was broken in the course of stretching. The mechanical properties and thermal properties of the film in Example 11 in which the blended amount of calcium carbonate was 20 percent by weight are shown in Table 4.

EXAMPLES 14 TO 19

A blend in which the content of an ethylene/propylene copolymer (mol ratio 90/10) of a melt index of 0.1 g./10 minutes was fixed to be 40 percent by weight but the contents of an ethylene/propylene copolymer (mol ratio 5/95) of a melt index of 2 g./10 minutes and calcium carbonate (average particle diameter 1.2 $\mu$) were varied as shown in Table 3 was melted at 250°C. and extruded in the form of a film, which was cooled on a cooling roll at 90°C. to obtain a film of a thickness of 900 $\mu$. This film was stretched 5 times the length in the ongitudinal direction between rolls different in the peripheral velocity and heated to 135°C. Then the film was fed into a tenter at 155°C. and was stretched 8 times the width in the transverse direction to obtain a film of a thickness of 30 to 50 $\mu$. Further, this film as held with tenter clips was heat-treated for 20 seconds in a hot air furnace at 150°C. The relations between the void content and light transmittance and the amount of addition of calcium carbonate of the obtained film are shown in Table 3.

TABLE 3

| Example | Amount of calcium carbonate (%) | Void content (c.c./100g.) | Light transmittance (%) |
|---|---|---|---|
| 14 | 0 | 26 | 92 |
| 15 | 5 | 41 | 70 |
| 16 | 10 | 55 | 49 |
| 17 | 20 | 77 | 28 |
| 18 | 30 | 123 | 18 |
| 19 | 40 | 180 | 12 |

As apparent from Table 3, with the increase in the blended amount of calcium carbonate, the void content of the film increases and the light transmittance reduces. By the way, when calcium carbonate was blended in an amount of 55 percent by weight, the film was broken in the course of stretching. The mechanical properties and thermal properties of the resulting film in Example 17 in which the blended amount of calcium carbonate was 20 percent by weight are shown in Table 4.

REFERENCE EXAMPLE 2

A blend of 40 percent by weight of an ethylene/propylene copolymer (mol ratio 5/95) of a melt index of 2 g./10 minutes, 40 percent by weight of an ethylene/propylene copolymer (ethylene content 40 percent by mol) and 20 percent by weight of calcium carbonate (particle diameter 1.2 $\mu$) was melted at 240°C. and was extruded to obtain a film of a thickness of 900 $\mu$. The film was then fed into a tenter at 140°C. and was stretched and heat-treated under the same conditions as in Example 14. The mechanical properties and thermal properties of the obtained film are shown in Table 4.

TABLE 4

| Items | | Example | | | | Reference | |
|---|---|---|---|---|---|---|---|
| | | 1 | 5 | 11 | 17 | 1 | 2 |
| Tensile strength kg./cm.² | Longitudinal | 661 | 640 | 623 | 570 | 151 | 105 |
| | Transverse | 405 | 397 | 385 | 532 | 114 | 86 |
| Tensile elongation, percent. | Longitudinal | 80 | 85 | 71 | 80 | 59 | 39 |
| | Transverse | 88 | 71 | 59 | 38 | 48 | 31 |
| Edge tear strength g. | Longitudinal | 117 | 121 | 129 | 140 | 108 | 130 |
| | Transverse | 172 | 170 | 181 | 257 | 146 | 192 |
| Thermal shrinkage, percent. | | 2.2 | 2.1 | 2.4 | 2.9 | 23.0 | 21.4 |

EXAMPLES 20 TO 26

A blend was prepared in which the content of a polyethylene (specific gravity 0.96) of a melt index of 0.06 g./10 minutes was fixed to be 15 percent by weight but the contents of a polystyrene (melt index 0.87 g./10 minutes) and calcium cabonate (particle diameter 1.2 $\mu$) were varied as shown in Table 5, the balance being a polypropylene (intrinsic viscosity 2.1 dl./g.) of a melt index of 2 g./10 minutes. The blend was melted at 250°C. and extruded in the form of a film, which was cooled on a cooling roll at 80°C. to obtain a film of a thickness of 1000 $\mu$. This film was stretched 5 times the length in the longitudinal direction between rolls different in the peripheral velocity and heated to 135°C. Then the film was stretched 8 times the width in the transverse direction to obtain a film of a thickness of 30 to 50 $\mu$. Further, this film as held with tenter clips was heat-treated for 20 seconds in a hot air furnace at 150°C. The relations between the stiffness, machine suppliability, void content and light transmittance of the obtained film and the amounts of addition of polystyrene and calcium carbonate are shown in Table 5.

TABLE 5

| Example | Blended, percent | | Stiffness | Machine suppliability | Void content, c.c./100 g. | Light transmittance, percent |
|---|---|---|---|---|---|---|
| | Polystyrene | Calcium carbonate | | | | |
| 20 | 0 | 23 | 0.51 | C | 101 | 24 |
| 21 | 5 | 20 | 0.62 | B | 81 | 29 |
| 22 | 10 | 30 | 0.71 | A | 171 | 9 |
| 23 | 10 | 50 | 0.79 | A | 270 | 6 |
| 24 | 60 | 20 | 0.81 | A | 48 | 50 |
| 25 | 65 | 20 | 0.80 | A | 22 | 95 |
| 26 | 20 | 20 | 0.75 | A | 80 | 28 |

As apparent from Table 5, with the increase in the amount of polystyrene, the stiffness becomes higher and the machine suppliability is improved. However when the polystyrene content exceeds a certain level the void content reduces. In fact, in the film of Example 25, the writability was remarkably low. The mechanical properties and thermal properties of the film of Example 26 are shown in Table 6.

REFERENCE EXAMPLE 3

A blend of 15 percent by weight of a polyethylene (melt index 0.06 g./10 minutes), 45 percent by weight of an ethylene/propylene copolymer (ethylene content 40 percent by mol), 20 percent by weight of a polystyrene (melt index 0.87 g./10 minutes) and 20 percent by weight of calcium carbonate (particle diameter 1.2 $\mu$) was melted at 240°C. and was extruded to obtain a film of a thickness of 1000 $\mu$. This film was stretched and heat-treated under the same conditions as in Example 26. The mechanical properties and thermal properties of the obtained film are shown in Table 6.

TABLE 6

| Items | | Example 26 | Reference 3 |
|---|---|---|---|
| Tensile strength (kg./cm²) | Longitudinal | 900 | 110 |
| | Transverse | 682 | 88 |
| Tensile elongation (%) | Longitudinal | 53 | 34 |
| | Transverse | 25 | 38 |
| Thermal shrinkage (%) | | 3.5 | 19.0 |

As evident from Table 6, the film of Example 26 of the present invention is higher in the mechanical properties and lower in the thermal shrinkage than that of the Reference Example 3.

EXAMPLE 27

A blend prepared by blending a polypropylene (melt index of 2 g./10 minutes), a polyethylene (melt index 0.06 g./10 minutes) and titanium dioxide having various average particle diameters as shown in Table 7 at a weight ratio of 60:20:20 was melted at 250°C. and extruded in the form of a film, which was cooled on a cooling roll at 90°C. to obtain a film of a thickness of 900 $\mu$. This film was stretched 5 times the length in the longitudinal direction between roll different in the peripheral velocity. Then the film was fed into a tenter at 160°C. and was stretched 8 times the width in the transverse direction to obtain a film of a thickness of 25 to 50 $\mu$. The relations between the void content and stretchability of the film and the particle diameter of titanium dioxide are shown in Table 7.

TABLE 7

| Particle diameter of titanium dioxide ($\mu$) | Void content (c.c./100g.) | Stretchability |
|---|---|---|
| Less than 0.1 | Less than 50 | Excellent |
| 0.1 to 10 | 50 to 300 | Excellent |
| 10 to 15 | 300 | Good |
| More than 15 | | Stretchable longitudinally but not transversely |

As shown in Table 7, as the particle diameter of titanium dioxide becomes larger, the void content of the film increases but, when the particle diameter exceeds 10 $\mu$, the void content reaches a substantial equilibrium and, when it exceeds 1.5 $\mu$, the film becomes difficult to stretch.

EXAMPLES 28 TO 33

A film of a thickness of 900 $\mu$ was prepared from a blend in which the content of calcium oxide (average particle diameter 1.2 $\mu$) was fixed to be 15 percent by weight but the content of a polyethylene (melt index 0.06 g./10 minutes) and and ethylene/propylene copolymer (mol ratio 5/95) of a melt index of 3 g./10 minutes were varied as shown in Table 8. The film was stretched 5 times the length in the longitudinal direction between rolls at 90°C. different in the peripheral velocity. Then the film was fed into a tenter at 155°C. and was stretched 8 times the width in the transverse direction to obtain a film of a thickness of about 35 to 50 $\mu$. The relations between the amount of addition of the polyethylene and the void content, light transmittance and stretchability at the time of the transverse stretching are shown in Table 8.

TABLE 8

| Example | Amount of polyethylene (%) | Void content (c.c./100g.) | Light transmittance (%) | Stretchability |
|---|---|---|---|---|
| 28 | 0 | 6 | 98 | Impossible |
| 29 | 5 | 48 | 68 | Good |
| 30 | 10 | 76 | 35 | Excellent |
| 31 | 30 | 82 | 32 | Excellent |
| 32 | 60 | 103 | 22 | Good |
| 33 | 75 | | | Impossible |

As apparent from Table 8, when the amount of addition of polyethylene becomes more than 70 percent by weight, the transverse stretchability remarkably reduces and the mechanical properties of the obtained film become poor.

EXAMPLE 34

A polypropylene of a melt index of 2 g./10 minutes, calcium carbonate of an average particle diameter of 1.2 $\mu$ and a polyethylene of a melt index of 0.06 g./10 minutes were blended at a weight ratio of 60:20:20. The blend was melted at 250°C. and extruded in the form of a film, which was cooled on a cooling roll at 90°C. to obtain a film of a thickness of 500 $\mu$. A polypropylene (intrinsic viscosity 2.1 dl./g.) melted at 240°C. was extruded and was laminated under a line pressure of 8 kg./cm. on one surface of the above prepared base film. Then the same polypropylene was melt-laminated under the same conditions on the other surface of the base film. The thickness of each covering layer was 150 $\mu$. Then this laminated film was stretched 5 times the length in the longitudinal direction at 145°C. and was then stretched 8 times the width in the transverse direction at 155°C. to obtain a biaxially stretched film of a thickness of 35 $\mu$. The mechanical properties and optical properties of this film are shown in Table 9.

For comparison, the properties of a biaxially stretched film of a thickness of 25 $\mu$ obtain by biaxially stretching under the same conditions the base film (uncoated film) of a thickness of 500 $\mu$ used in this example are also shown in Table 9 as Reference Example 4.

TABLE 9

| Items | | Example 34 | Reference Example 4 |
|---|---|---|---|
| Gloss (%) | 45 degrees | 115 | 36 |
| | 60 degrees | 100 | 45 |
| | 75 degrees | 103 | 75 |
| Tensile strength (kg./cm$^2$) | Longitudinal | 1010 | 660 |
| | Transverse | 1980 | 410 |
| Tensile elongation (%) | Longitudinal | 146 | 79 |
| | Transverse | 49 | 88 |

As evident from Table 9, the film of this example is remarkably higher in the surface gloss and tensile strength than the film of the Reference Example 4. Further, when the film of Reference Example 4 was peeled off with a Scotch tape No. 59, the lamina on the film surface peeled off but, in the film of Example 34, no peeling-off occurred.

What is claimed is:

1. A method for making a paper-like polymeric film containing minute internal voids, having a rough surface with fine irregularities in a finely fibrillated state, the void content of said film being 40 – 300 c.c./100 g. and the transmittance of rays being not higher than 70 percent which comprises melting a blended composition comprising at least 5 percent by weight of a polypropylene or ethylene/propylene copolymer having an ethylene content of 0–15 mol percent, 5–70 percent by weight of a polyethylene or ethylene/propylene copolymer having a propylene content of 0–30 mol percent and 5–50 percent by weight of finely divided solid inorganic substance having an average particle diameter of 0.1–15 $\mu$, extruding the melt into a film, and biaxially stretching the film, first at 40°–170°C. and 4 to 6 times the original length in one direction, and second, at a temperature higher than in the first stretching but below 220°C. and 5 to 8 times the original length in another direction substantially at right angles to the above-mentioned first stretching direction.

2. A method according to claim 1 which further contains 5–60 percent by weight of a polystyrene resin.

3. A method according to claim 1 wherein said inorganic substance is selected from the group consisting of calcium carbonate, calcium oxide, titanium dioxide, silicon dioxide, aluminum oxide and aluminum sulfate.

4. A method according to claim 2 wherein said polystyrene resin is selected from the group consisting of polystyrene, an acrylonitrile/butadiene/styrene copolymer, an acrylonitrile/styrene copolymer and a butadiene/styrene copolymer.

5. A method according to claim 1 wherein the average diameter of the minute voids on the surface of the thus-produced polymeric film is 4 to 250 $\mu$ and the depth of the irregularities on the surface of the polymeric film is 0.5 to 10 $\mu$.

6. A paper-like polymeric film produced according to the method of claim 1.

* * * * *